Patented Nov. 3, 1936

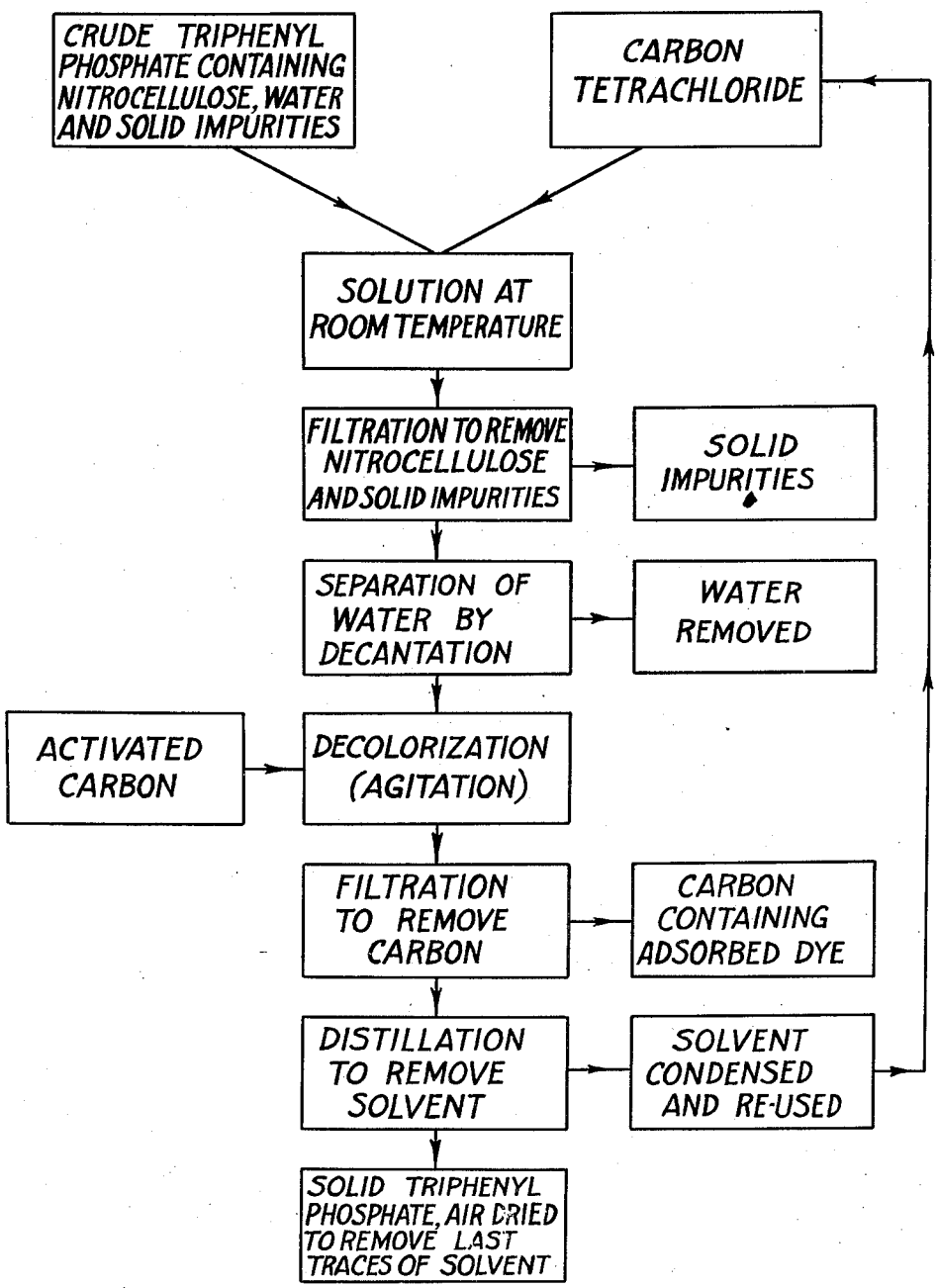

2,059,912

UNITED STATES PATENT OFFICE 2,059,912

REFINING OF CRUDE TRIPHENYL-PHOSPHATE

Marvin J. Reid, Rochester, N. Y., assignor, by mesne assignments, to Eastman Kodak Company, Jersey City, N. J., a corporation of New Jersey Application April 8, 1936, Serial No. 73,323

4 Claims. (Cl. 260—99.20)

This invention relates to the refining of plasticizers employed in the manufacture of cellulose organic acid ester film and sheeting and more particularly to a process for refining triphenyl phosphate contaminated with various impurities such as nitrocellulose, water, metallic salts and the like.

In my prior Patent No. 1,994,591 I have described a process for the recovery of a plasticizer such as triphenyl phosphate from photographic film scrap and similar plastic materials in which the plasticizer is extracted from the scrap by means of a leaching solvent such as methyl alcohol. According to that process a crude form of triphenyl phosphate is obtained in the preliminary steps and this crude material, still containing a considerable amount of water, nitrocellulose and other solid impurities, is refined by dissolving in a hydrocarbon liquid which is a solvent for the plasticizer but a non-solvent for the cellulose derivative and other impurities, filtering off the undissolved material and finally crystallizing the pure triphenyl phosphate from the solution. While this method of refining the crude plasticizer is quite satisfactory, so far as obtaining a pure product is concerned, it has several serious disadvantages. For example, it is necessary to maintain the hydrocarbon solvent at relatively high temperatures in order that the dissolved plasticizer may be brought into and held in solution. After the suspended impurities are mechanically removed, the plasticizer crystallizes out and may be separated from the solvent by filtration or other mechanical means. It will readily be seen that not only is such a method likely to be extremely costly from the standpoint of equipment and operation, but the losses through evaporation of solvent are relatively very high. In addition, there is constant danger of fire or explosion due to the highly inflammable nature of the solvent and its tendency to form explosive mixtures in the equipment.

An alternative procedure for refining this type of crude triphenyl phosphate is disclosed in my copending application No. 743,611, filed September 11, 1934. According to that procedure, the crude is dissolved in ethylene dichloride, subjected to the the action of centrifugal force and, if desired, decolorized with activated carbon. The decolorized solution of triphenyl phosphate may then be used as a solvent in making film support. This process, however, has two disadvantages. First, if the concentration of triphenyl phosphate is too great, the solution is a solvent for the nitrocellulose impurities with the consequence that there is a rather low limit to the amount of triphenyl phosphate that can be dissolved. The second disadvantage is that the plasticizer solution obtained in this process can be used only for film formulas in which ethylene dichloride may be used.

It is the principal object of the present invention to obviate the difficulties outlined above and to provide a process for refining crude triphenyl phosphate containing as impurities, nitrocellulose, water, metallic salts and other materials, whereby the plasticizer is obtained in solid form and in substantially 100% pure condition. A further object is to provide a method of refining impure triphenyl phosphate without the employment of solvents which are capable of forming explosive mixtures with air. Other objects will appear hereinafter.

These objects are accomplished by the following invention which, in its broader aspects, comprises dissolving the crude plasticizer in carbon tetrachloride at room temperature, removing insoluble solid impurities and water and, after decolorizing with activated carbon and filtering, distilling the clear water-white solution to obtain a solid molten mass of pure plasticizer, which is thereafter pulverized and air-dried. In accordance with this procedure, a solid, practically 100% pure form of triphenyl phosphate is obtained, which may be used in the manufacture of any type of cellulose derivative photographic film or other plastic product in which this material may be used as a plasticizer. I have found that all of the inherent disadvantages of the previously developed methods of refining this plasticizer are avoided.

In the following examples and description, I have set forth several of the preferred embodiments of my invention, but they are included merely for purposes of illustration and not as a limitation thereof.

In the single figure of the drawing, I have illustrated my invention by means of a flow sheet showing the various steps as they are carried out in practice. My invention will be more fully understood by reference to the following example:

Example 1500 grams of crude triphenyl phosphate (such as that obtained after filtering off the 50% aqueous alcohol solution from the mixture of solvent and triphenyl phosphate crystals, but before dissolving the crystals in naphtha as disclosed in my Patent No. 1,994,951) is dissolved in 10 liters of carbon tetrachloride. The solution is filtered to remove impurities such as nitrocellulose, metallic salts, rust, etc. The water which may be present in the crude, being insoluble in the carbon tetrachloride, separates therefrom and is mechanically removed as by decantation, centrifuging or the like. The solution is then decolorized by adding about 4 ounces of activated carbon, agitating well and filtering to remove the carbon. The clear water-white carbon tetrachloride solution of triphenyl phosphate is then vacuum distilled at a temperature of 35–50° C. under a vacuum of about 22 inches of mercury. After carbon tetrachloride ceases to distil over, the molten residue of triphenyl phosphate in the still is poured into a suitable vessel and allowed to cool and solidify. Upon solidification, the material will contain up to about 3% carbon tetrachloride, depending upon the extent of the distillation. This relatively small amount of residual solvent is readily removed by air-drying at room temperature.

The product resulting from this process is a practically 100% pure form of triphenyl phosphate which can be immediately used in making up any type of cellulose derivative plastic in which triphenyl phosphate is employable as a plasticizer.

It will be evident that many changes may be made in the procedure above outlined within the scope of my invention. For example, the crude material may be dissolved in varying concentrations. The various filtering, separating and other operations may also vary in accordance with the particular type of crude material dealt with, the impurities contained therein, and various other factors. While I prefer to employ vacuum distillation for separating the carbon tetrachloride from the solution, ordinary distillation may be employed if desired. Under some circumstances, the material need not be subjected to the final air-drying step, although for most film-making purposes the carbon tetrachloride should be removed, as it is a non-solvent for the most types of cellulose derivative material.

What I claim is:

1. The method of refining impure triphenyl phosphate containing solid and liquid impurities insoluble in carbon tetrachloride, which comprises dissolving the impure material in carbon tetrachloride, mechanically separating the undissolved impurities from the solution and then distilling off the carbon tetrachloride, whereby substantially 100% pure triphenyl phosphate is obtained.

2. The method of refining impure triphenyl phosphate containing impurities such as nitrocellulose, water and other materials insoluble in carbon tetrachloride, which comprises dissolving the impure material in carbon tetrachloride, filtering off the undissolved nitrocellulose and other solids, separating the water from the solution, distilling off the carbon tetrachloride to obtain a molten mass of triphenyl phosphate, solidifying the mass and air-drying to remove the last traces of residual solvent, whereby substantially 100% pure triphenyl phosphate is obtained.

3. The method of refining impure triphenyl phosphate containing impurities such as nitrocellulose, water and other materials insoluble in carbon tetrachloride, which comprises dissolving the impure material in carbon tetrachloride at room temperature, filtering off the undissolved nitrocellulose, separating water from the solution, adding activated carbon to the solution to remove the coloring material therefrom, filtering to remove the color-containing carbon, distilling off the carbon tetrachloride to obtain a molten mass of triphenyl phosphate, solidifying the mass and air-drying it to remove the last traces of residual solvent, whereby substantially 100% pure triphenyl phosphate is obtained.

4. The method of refining impure triphenyl phosphate containing impurities such as nitrocellulose, water and other materials insoluble in carbon tetrachloride, which comprises dissolving the impure material in carbon tetrachloride at room temperature, filtering off the undissolved nitrocellulose, separating water from the solution, adding activated carbon to the solution, to remove the coloring material therefrom, filtering to remove the color-containing carbon, distilling off the carbon tetrachloride under reduced pressure to obtain a molten mass of triphenyl phosphate, solidifying the mass and air-drying to reduce the last traces of residual solvent, whereby substantially 100% pure triphenyl phosphate is obtained.

MARVIN J. REID.